United States Patent
Monti et al.

(10) Patent No.: US 11,550,302 B2
(45) Date of Patent: Jan. 10, 2023

(54) METHOD FOR THE SETUP AND/OR THE RECONFIGURATION OF AN INDUSTRIAL PLANT, PARTICULARLY FOR THE MANUFACTURING OF MOTOR VEHICLES OR SUBASSEMBLIES THEREOF

(71) Applicant: FCA Italy S.p.A., Turin (IT)

(72) Inventors: Denny Monti, Turin (IT); Antonino Polimeni, Turin (IT); Marco Verger, Turin (IT); Diego Biancardi, Turin (IT)

(73) Assignee: FCA Italy S.p.A., Turin (IT)

( * ) Notice: Subject to any disclaimer, the term of this patent is extended or adjusted under 35 U.S.C. 154(b) by 945 days.

(21) Appl. No.: 16/365,883

(22) Filed: Mar. 27, 2019

(65) Prior Publication Data
US 2019/0302744 A1 Oct. 3, 2019

(30) Foreign Application Priority Data
Mar. 29, 2018 (IT) .......................... 102018000004086

(51) Int. Cl.
*G05B 19/418* (2006.01)
*G05D 1/02* (2020.01)
(Continued)

(52) U.S. Cl.
CPC ........ *G05B 19/41815* (2013.01); *B23P 21/00* (2013.01); *B23P 21/004* (2013.01);
(Continued)

(58) Field of Classification Search
CPC . Y10T 29/53365–53426; B23P 21/004; B23Q 37/007; G05B 19/41815
See application file for complete search history.

(56) References Cited

U.S. PATENT DOCUMENTS 4,237,598 A * 12/1980 Williamson ....... G05B 19/4189
29/563
4,385,685 A * 5/1983 Sticht ..................... G05B 19/07
198/341.04
(Continued)

FOREIGN PATENT DOCUMENTS

FR 2396438 A1 1/1979
JP 2008229738 A 10/2008
WO 2011121255 A1 10/2011

OTHER PUBLICATIONS

Italian Search Report dated Nov. 26, 2018. 2 pages.

*Primary Examiner* — Jason L Vaughan
(74) *Attorney, Agent, or Firm* — RMCK Law Group PLC (57) ABSTRACT

Described herein is a method for setting up and/or reconfiguring an industrial plant, in particular for the manufacture of motor vehicles or sub-assemblies thereof. The method includes providing a plurality of mobile processing stations, each mobile processing station comprising a palletisable platform and at least one interface unit provided on the palletisable platform and configured for the coupling of the mobile processing station with one or more further adjacent mobile processing stations; arranging mobile processing stations according to a pre-set layout; and coupling at least one interface unit of each mobile processing station with the at least one interface unit of one or more further mobile processing adjacent stations thereto. Each interface unit includes at least one of the following: an electrical and/or electronic coupling device; a fluidic coupling device; and a mechanical coupling device.

9 Claims, 11 Drawing Sheets

(51) Int. Cl.
  *B23P 21/00* (2006.01)
  *B23Q 37/00* (2006.01)
  *G06Q 50/04* (2012.01)
  *E04H 5/02* (2006.01)
  *G06Q 10/06* (2012.01)
  *H01R 13/00* (2006.01)

(52) U.S. Cl.
  CPC ....... *B23Q 37/007* (2013.01); *G05B 19/4187* (2013.01); *G05D 1/0212* (2013.01); *G05D 1/0287* (2013.01); *E04H 5/02* (2013.01); *G05D 2201/0216* (2013.01); *G06Q 10/063* (2013.01); *G06Q 50/04* (2013.01); *H01R 13/005* (2013.01)

(56) References Cited

U.S. PATENT DOCUMENTS

| | | | | |
|---|---|---|---|---|
| 5,125,149 A * | 6/1992 | Inaba | ................... | B23P 21/004 29/430 |
| 5,150,451 A * | 9/1992 | Deplano | .......... | G05B 19/41825 901/46 |
| 6,401,011 B1 * | 6/2002 | Hashimukai | ........... | B25J 9/1682 29/430 |
| 6,912,443 B2 * | 6/2005 | Duemler | .......... | G05B 19/41845 700/169 |
| 7,076,865 B2 * | 7/2006 | Morbitzer | ............. | B23P 21/004 29/430 |
| 7,111,390 B2 * | 9/2006 | Shimamura | ............. | B81C 3/002 29/700 |
| 8,086,341 B2 * | 12/2011 | Spangler | .......... | G05B 19/41815 700/229 |
| 8,474,132 B2 * | 7/2013 | Li | ............................ | E04H 5/02 29/430 |
| 8,626,329 B2 * | 1/2014 | Dickson | ........... | H01L 21/67276 700/229 |
| 9,814,170 B2 * | 11/2017 | Gieskes | ................... | B25J 19/02 |
| 10,569,374 B2 * | 2/2020 | Ishiyama | .............. | B23P 21/004 |
| 2008/0178537 A1 | 7/2008 | Spangler et al. | | |
| 2009/0012642 A1 * | 1/2009 | Mertens | ................ | B23P 21/004 700/112 |
| 2009/0151148 A1 * | 6/2009 | Reinisch | ................ | B23Q 1/015 29/563 |
| 2015/0354201 A1 | 12/2015 | Gruetering | | |

* cited by examiner

METHOD FOR THE SETUP AND/OR THE RECONFIGURATION OF AN INDUSTRIAL PLANT, PARTICULARLY FOR THE MANUFACTURING OF MOTOR VEHICLES OR SUBASSEMBLIES THEREOF

CROSS-REFERENCE TO RELATED APPLICATION

This application claims priority to Italian Patent Application No. 102018000004086 filed Mar. 29, 2018. The disclosure of the above application is incorporated herein by reference in its entirety.

FIELD OF THE INVENTION

The present invention relates to industrial plants, in particular to plants for the manufacture of motor vehicles or sub-assemblies thereof.

PRIOR ART

Industrial plants, in particular those for the manufacture of motor vehicles, up to the present day in general have a rigid structure in which one or more processing stations are arranged according to a fixed layout dictated by the production cycle and are linked to the infrastructure in a way that is basically inseparable, or practically such.

In greater detail, the line structures of industrial plants are supplied by electrical/electronic and fluidic systems that are fixed or integrated in the line structures, and in many cases are arranged in an overhead position (which renders the association of position of the termination of the particular system to the processing station substantially obligate).

Not only so, but part of the above processing stations can themselves be mounted in an overhead position (for example, an overhead conveyor), with the further consequence of rendering substantially or almost immutable the position of a certain station with respect to the infrastructure that houses it, especially in view of possible needs of reconfiguration.

Currently, the solution used in industrial plants for reconfiguring the lines basically consists in providing one or more vacant stations in strategic points of the line or of the plant so as to be able to accommodate additional stations in future, in the case where this becomes necessary.

It remains, however, evident how this logic cannot in itself tackle all the needs for reconfiguration that may arise, and in particular how this logic is altogether ineffective as regards reconfigurations that envisage removal of processing stations or their re-location elsewhere in so far as it is altogether unable to compensate for such a removal. Instead, only filling of the vacant stations with new stations is currently possible: nothing else is practicable.

A further, subordinate, technical problem connected to industrial plants of a known type is linked to the overhead structures. These structures permanently load the structures of the building that houses the plant, such as the trusses and vaults of industrial sheds, the pillars, and in general all the structural nodes of the building.

This means that, in addition to not allowing fast reconfiguration of the lines for the aforementioned reason, the overhead structures likewise impose periodic checks and adaptations to maintain the values of the so-called node load aligned to the design values, frequently giving rise to considerable works of renewal and strengthening of the structures.

OBJECT OF THE INVENTION

The object of the present invention is to overcome the technical problems mentioned previously. In particular, the object of the invention is to provide a method for setting up industrial plants and enabling fast reconfiguration thereof and moreover for reducing or eliminating the structural requirements for the constructions that house the plant so as to reduce the running costs of the plant itself.

SUMMARY OF THE INVENTION

The object of the present invention is achieved by a method having the characteristics that form the object of one or more of the ensuing claims, which constitute an integral part of the technical teaching provided herein in relation to the invention.

In particular, the object of the invention is achieved by a method for setting up and/or reconfiguring an industrial plant, in particular for the manufacture of motor vehicles or sub-assemblies thereof, the method comprising:
   providing a plurality of mobile processing stations, each mobile processing station comprising a palletisable platform and at least one interface unit provided on the palletisable platform and configured for the coupling of the mobile processing station with one or more further adjacent mobile processing stations;
   arranging said mobile processing stations according to a predetermined layout; and
   coupling the at least one interface unit of each mobile processing station to the at least one interface unit of one or more further mobile processing stations adjacent thereto,
   wherein each interface unit comprises at least one of the following:
   an electrical and/or electronic coupling device;
   a fluidic coupling device; and
   a mechanical coupling device.

BRIEF DESCRIPTION OF THE DRAWINGS

The invention will now be described with reference to the annexed drawings, which are provided purely by way of non-limiting example and in which.

DETAILED DESCRIPTION OF THE INVENTION

Figure 1:
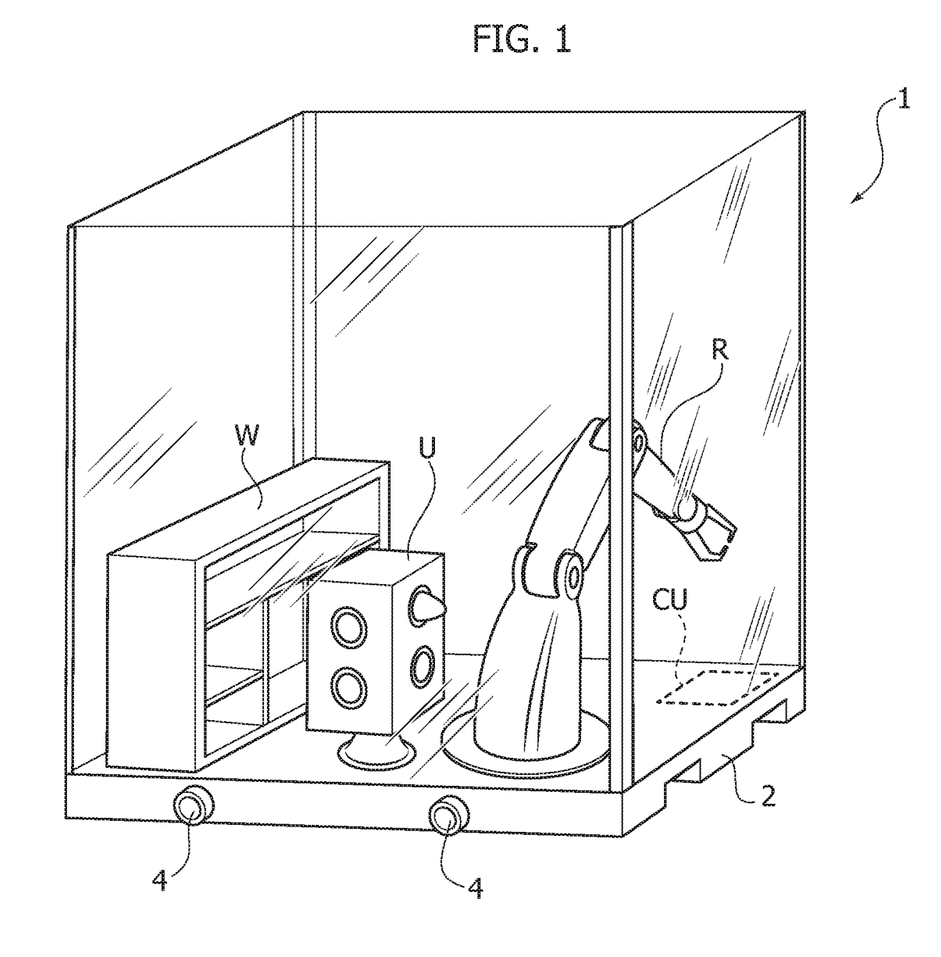
FIG. 1 is a schematic view of a mobile processing station for an industrial plant used in the method according to the invention.

With reference to FIG. 1, the reference number 1 designates as a whole a mobile processing station according to the invention. The mobile station 1 comprises a palletisable platform 2 and at least one interface unit provided on the palletisable platform 2. In this embodiment, the palletisable platform 2 comprises two interface units arranged on opposite sides thereof, but in general it is possible to provide one interface unit for each side according to the needs of arrangement of the stations. In particular, since the station 1 is configured for coupling to one or more adjacent stations, by envisaging an interface unit for each side of the palletisable platform, it is possible to enable coupling on any side.

Figure 2:
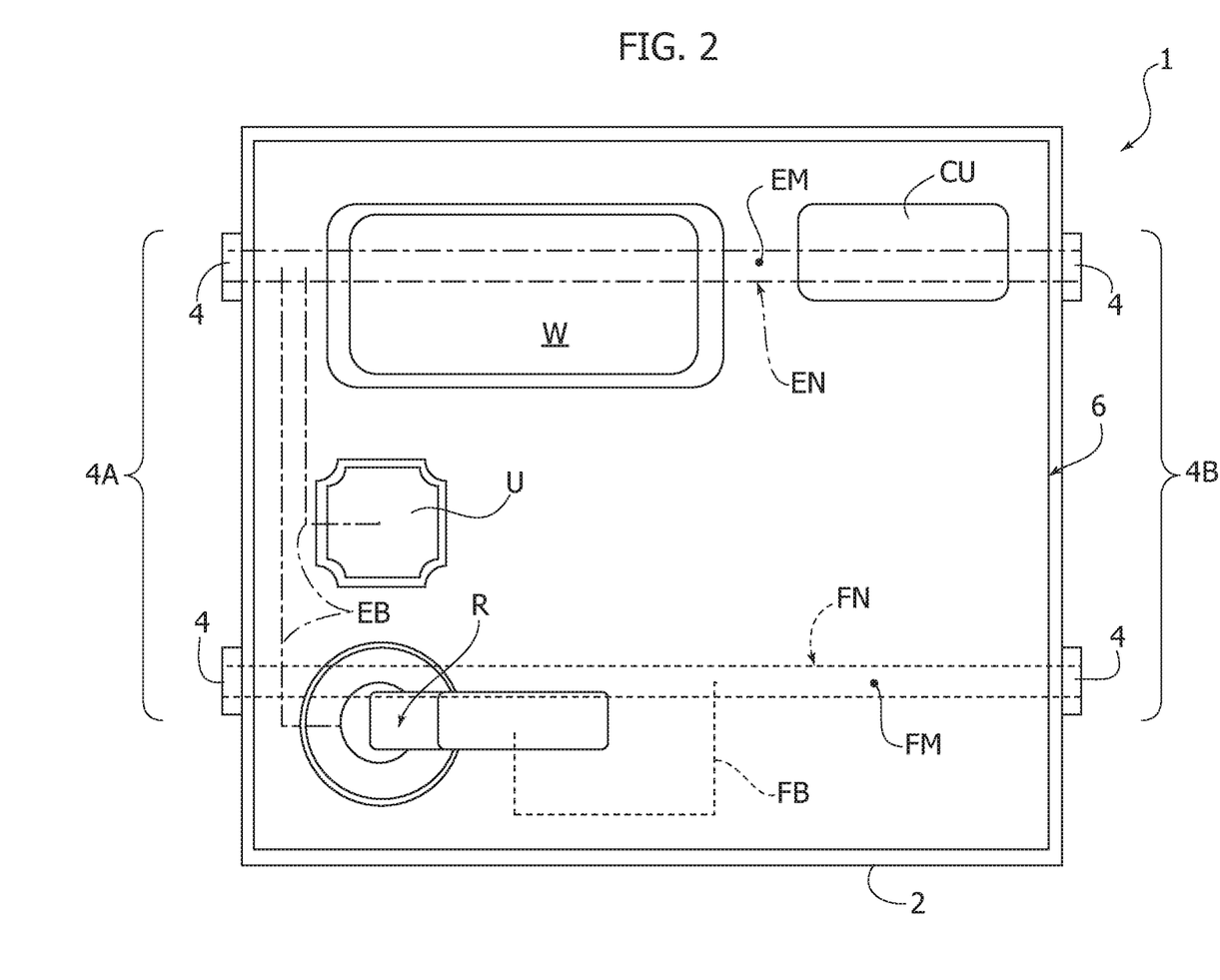
FIG. 2 is a schematic view of an interface unit of the station of FIG. 1.

In the embodiment illustrated herein, the station 1 comprises two interface units 4A and 4B, but in the present description the interface unit is in general associated to the reference 4. Defined on the palletisable platform 2 is an operative volume 6, arranged within which is at least one of the following (c.f. FIG. 2):
- one or more processing machines, for example an industrial robot R;
- one or more magazines for workpieces or components, for example the magazine W;
- one or more tool magazines, for example the magazine U, possibly configured for co-operating with the industrial robot R for changing the tool mounted thereon; and
- one or more electronic controllers CU that constitute a local intelligence of the station 1, which is configured for co-operating with general electronic controllers of the plant that constitute a higher level of intelligence.

Each interface unit comprises at least one of the following: an electrical and/or electronic coupling device; a fluidic coupling device; and a mechanical coupling device. Preferably, each palletisable platform 2 comprises interface units equipped with all three of the aforementioned devices, which are used (or deactivated) according to the need. Preferably, the function of mechanical coupling is implemented in combination with an electrical/electronic and/or fluidic coupling device, thus providing a sort of universal connector for the stations 1. Illustrated by way of example in the diagram of FIG. 2 is an embodiment of the station 1, where obtained in the palletisable platform 2 are a fluidic network FN (dashed line) and an electrical network EN (dashed-and-dotted line). These networks or systems may preferably comprise a respective main line, FM (for the fluidic system), EM (for the electrical system), that traverses the palletisable platform 2 joining the homologous interface units on opposite sides of the platform (or in any case on different sides), and may comprise one or more respective branches, FB (for the fluidic system), EB (for the electrical system), which carry the fluidic and electrical supply to the units on board the platform 2, according to the needs. The main lines FM may also have paths that extend between adjacent pairs of sides, or else paths incident/orthogonal with respect to one another so as to connect the interface units 4, however these may be arranged on the platform 2. For instance, if a platform 2 is used at the corner between two orthogonal arrays of further platforms 2, the connection to its interface units 4 will be made on adjacent sides, and in particular mutually orthogonal sides.

The structure with main line, as will be seen hereinafter, is useful in the case where the station 1 is to be used as mere connection element between adjacent stations, for example when one of the systems on board is not required, or none of them is required, to supply any unit of the station.

By means of the interface units 4 it is possible to integrate in the palletisable platform all the supply lines of the station, and it is possible in this way to convey the electrical or fluidic supply between stations 1 of the plant without any need for extensive fixed networks or systems being installed in the building that houses the plant. Not only this, but the interface units 4 also enable mechanical coupling of the palletisable platforms 2 so as to ensure mutual positioning of the stations 1 in the case where this were to be required.

Alternatively, the interface unit 4 can enable coupling to fixed positioning structures arranged on the floor in the case where the stations 1 were to be arranged according to a layout that does not envisage strict adjacency.

Figure 2A:
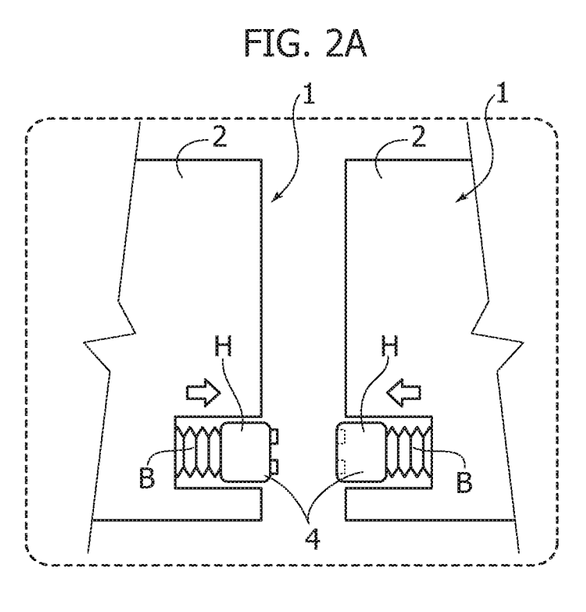
FIGS. 2A, 2B, and 2C are schematic views of an embodiment of the interface unit.
Figure 2B:
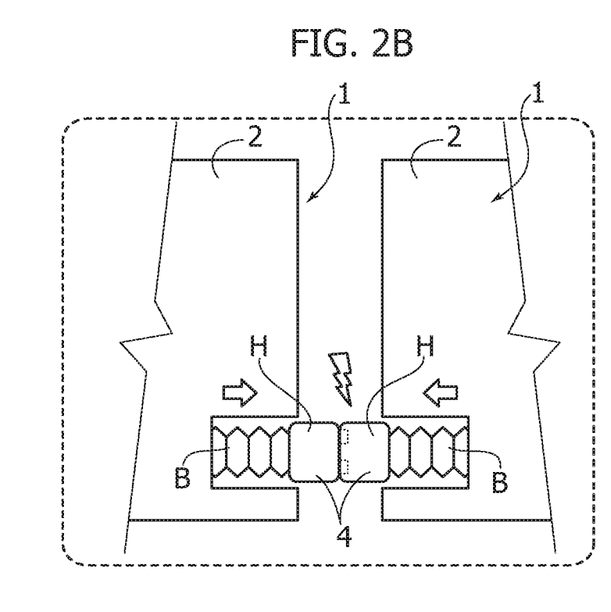
Figure 2C:
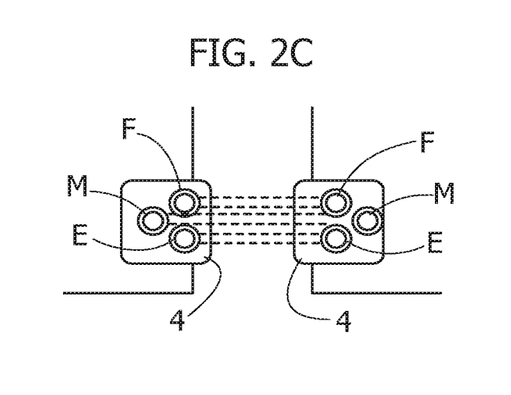

An example of interface unit is illustrated in the diagrams of FIGS. 2A, 2B, and 2C. Each interface unit is, for example, provided as automatic coupler (at least roughly resembling an automatic coupler for rail vehicles) that includes a head H and an extensible portion B—preferably resembling a bellows—that connects the head H to the plants on board the platform and enables displacement of the head 4 itself.

Provided at the head H—in the complete configuration—are the mechanical interface M, the electrical/electronic interface E, and the fluidic interfaces F (FIG. 2C). The respective electrical/electronic and fluidic lines are routed within the extensible portion B for connection to the systems (for example, the main lines FM, EM) on board the platform 2.

It should moreover be borne in mind that, according to the needs, it is possible to have a larger number of interface units 4 in the version with a head H on each side of the platform 2: in this case, it is possible to distribute the interfaces H, F, M in a uniform way on the heads or else concentrate some interfaces on one head and provide the remaining ones on another head.

It is moreover possible to have just one interface unit 4 in the version with a head H for each side, for example in the case where it is desired to relegate to a simpler interface unit once again set on the same side (for example, a simple mechanical coupler) the function of mechanical interface between adjacent platforms 2.

As may be seen in FIG. 2A, when the interface units 4 are inactive, they are located in a retracted position within a seat provided on the platform 2. At the moment of coupling (or prior to decoupling) they are located in a position extracted with respect to the seat (FIG. 2B). Extraction thereof is guided by the extensible portion B. To enable coupling it will consequently be necessary to carry out extension of the portions B in order to set the respective heads H of two facing interface units 4 up against one another and join them together, whereas to carry out decoupling it will be necessary to release the two heads H previously connected and compress the extensible portions B, getting the heads H to fit back into the respective seats.

Figure 3:
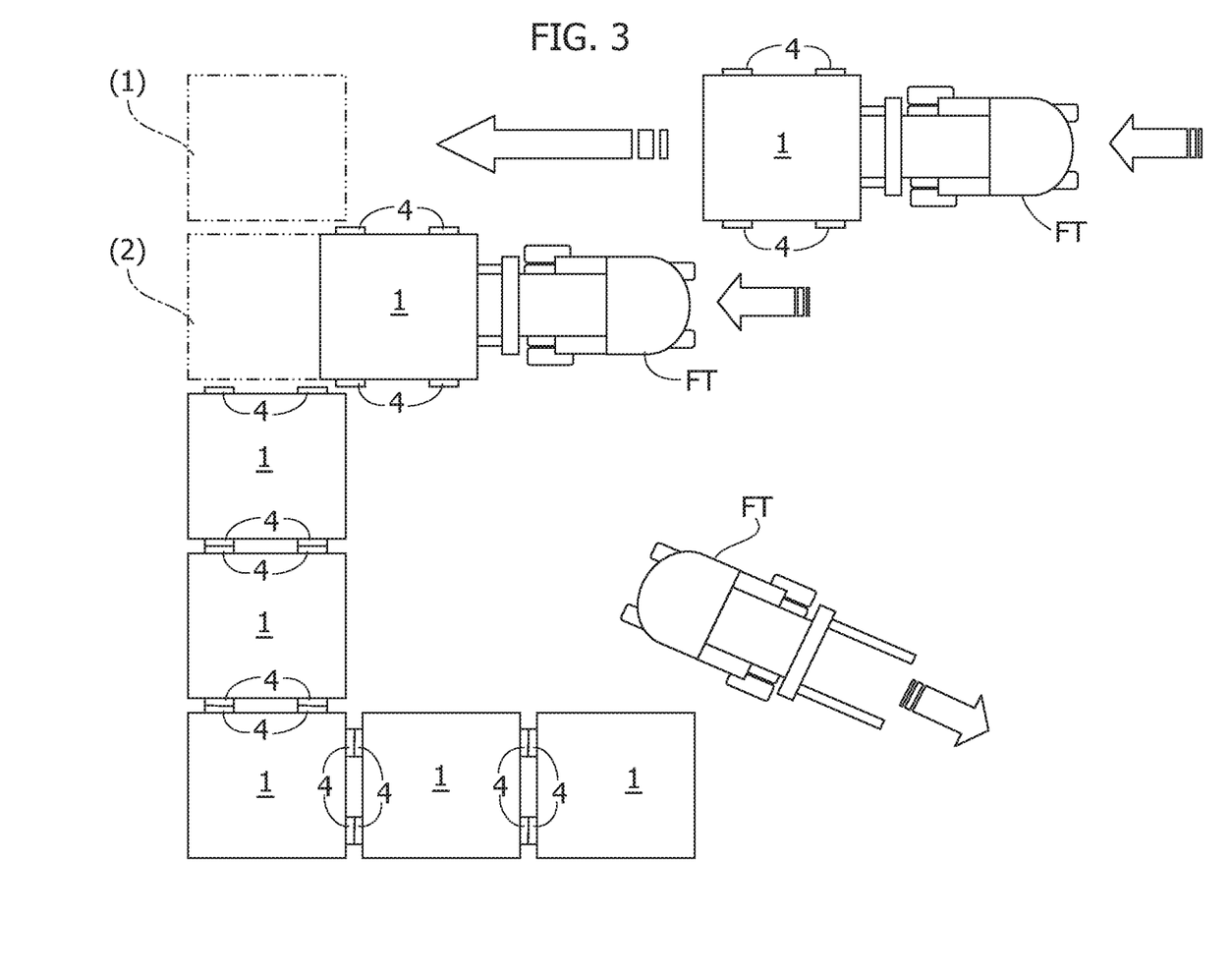
FIG. 3 illustrates a sequence of operations for setting up an industrial plant according to the method underlying the invention.

With reference to FIG. 3, at the moment of setting up the industrial plant, the flexibility of the stations 1 basically enables installation of an industrial plant proceeding according to the steps described in what follows.

A first step consists in providing a plurality of mobile processing stations 1 according to the needs of the production cycle; by way of non-limiting example, in the case of a plant for manufacturing motor vehicles, the mobile stations 1 may comprise body-in-white (welding) stations, painting stations, body-in-white stations, and stations for assembly of vehicle sub-assemblies.

A second step consists in arranging the mobile processing stations according to a pre-set layout, where this layout is dictated by the specific sequence of operations that is envisaged for the production cycle. Again, in the case of motor vehicles, the sequence of operations—except for certain operations that require a given sequence (e.g., welding of the body prior to painting)—may depend upon the model of vehicle produced. As illustrated in FIG. 3, the arrangement according to the pre-set layout is preferably obtained by moving the stations 1 using forklift trucks FT, which can insert their forks into the palletisable platform 2, lift the station 1, and position it where required. The relative positioning of the stations (for example, when a double row of stations 1 is to be created, located between which is an assembly line, in the case of a plant for the manufacture of motor vehicles) can be rendered more precise by means of templates or auxiliary frames.

A third step consists in coupling the at least one interface unit 4 of each mobile processing station 1 with at least one interface unit 4 of one or more further mobile processing stations 1 adjacent thereto in such a way as to provide, according to the needs, the electrical, and/or fluidic, and/or mechanical coupling of the processing stations 1 of the plant by means of the interface units 4. It should be borne in mind, as has been mentioned, that in certain cases a mobile processing station 1 that does not directly require, for example, supply of fluid, may in any case be fluidically coupled to the adjacent stations in so far as, according to the position that it occupies in the pre-set layout of the stations 1, it is convenient for it to function as stretch of fluidic connection between the stations adjacent thereto, which may possibly require supply of fluid or may once again function as mere connection elements. In this sense, provision of a main-line scheme for the electrical and/or fluidic systems enables easy implementation of this possibility, without recourse to external bypass lines.

Moreover, some stations 1 can be purposely equipped with interface units 4 not designed for coupling to other stations 1. In particular, these interface units may be designed for temporary connection to an auxiliary mobile station, for example transported by means of an AGV (Automated Guided Vehicle), which interacts with some equipment on board the station 1 for given operations. For instance, when the station 1 is provided with an industrial robot R (for example, a welding robot, a handling robot, a painting robot, etc.) in the case of high-power welding, the needs for cooling the welding jaws may prove excessive for the capacity of the system on board the platform 2. In this case, the auxiliary station may consist of a mobile chiller unit, which is temporarily coupled to the platform 2 that carries the robot R to contribute to cooling of the jaws. An implementation of this arrangement is illustrated in FIGS. 3A and 3B.

Figure 3A:
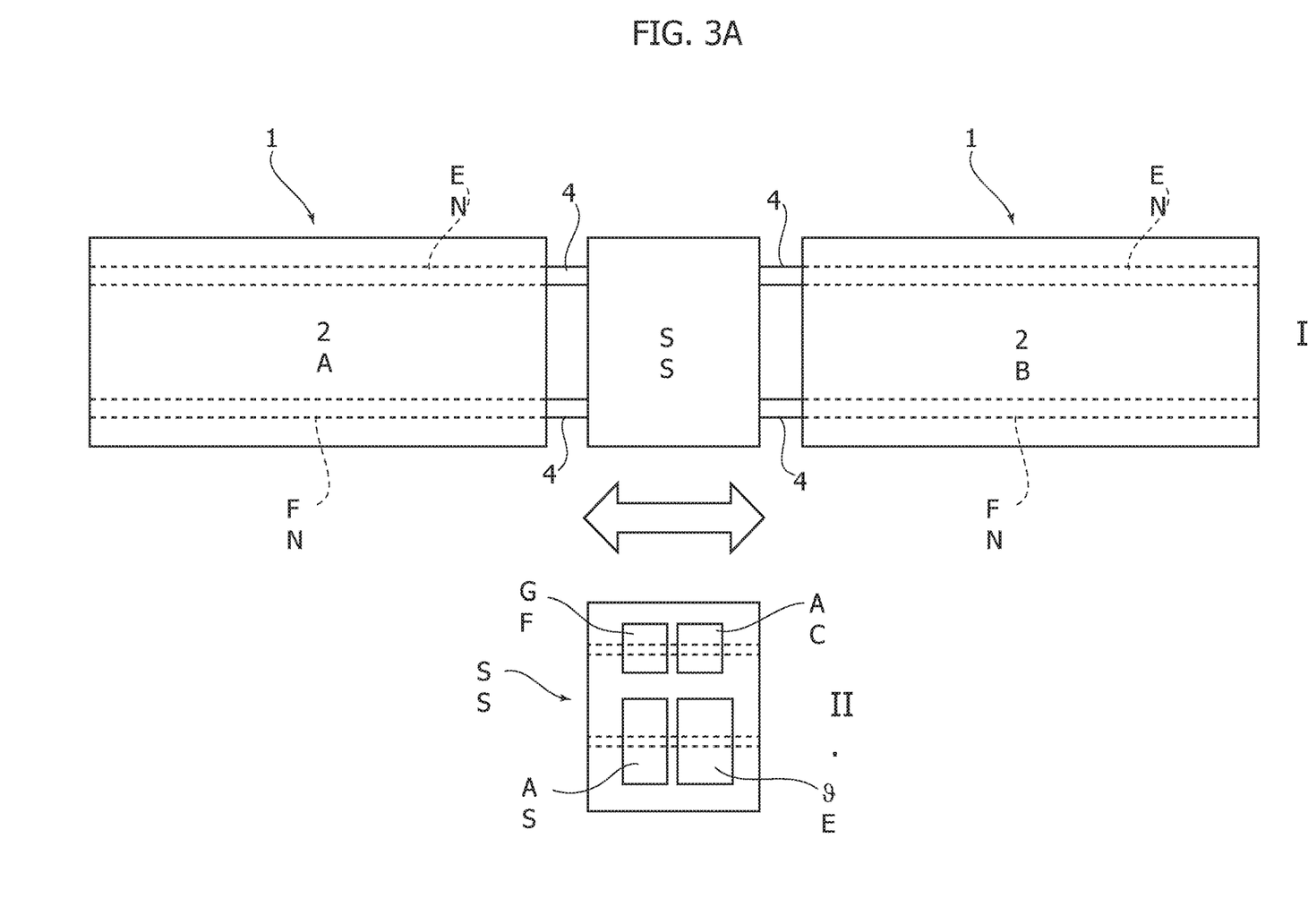
FIG. 3A, in parts I and II, illustrates a plant configuration that uses an auxiliary station, in the case in point a service station.

FIG. 3A, in part I, shows schematically two stations 1 (two platforms 2) joined to a service station SS set in an intermediate position between them. Coupling is obtained, by way of example, via two pairs of interface units 4 on opposite sides of the station SS.

FIG. 3A, in part II, shows schematically the structure of the station SS: this comprises, on board, a refrigerating unit GF, a unit for supply of compressed air AC, a suction unit AS, and an electrical control panel QE. Each of these units provides on the outside, through the interface units 4 of the station SS, a respective fluidic and/or electrical power line. The power lines in question, once again through the interface units 4, directly connect up to the systems on board the stations 1 (networks FN, EN) through the interface units 4.

Figure 3B:
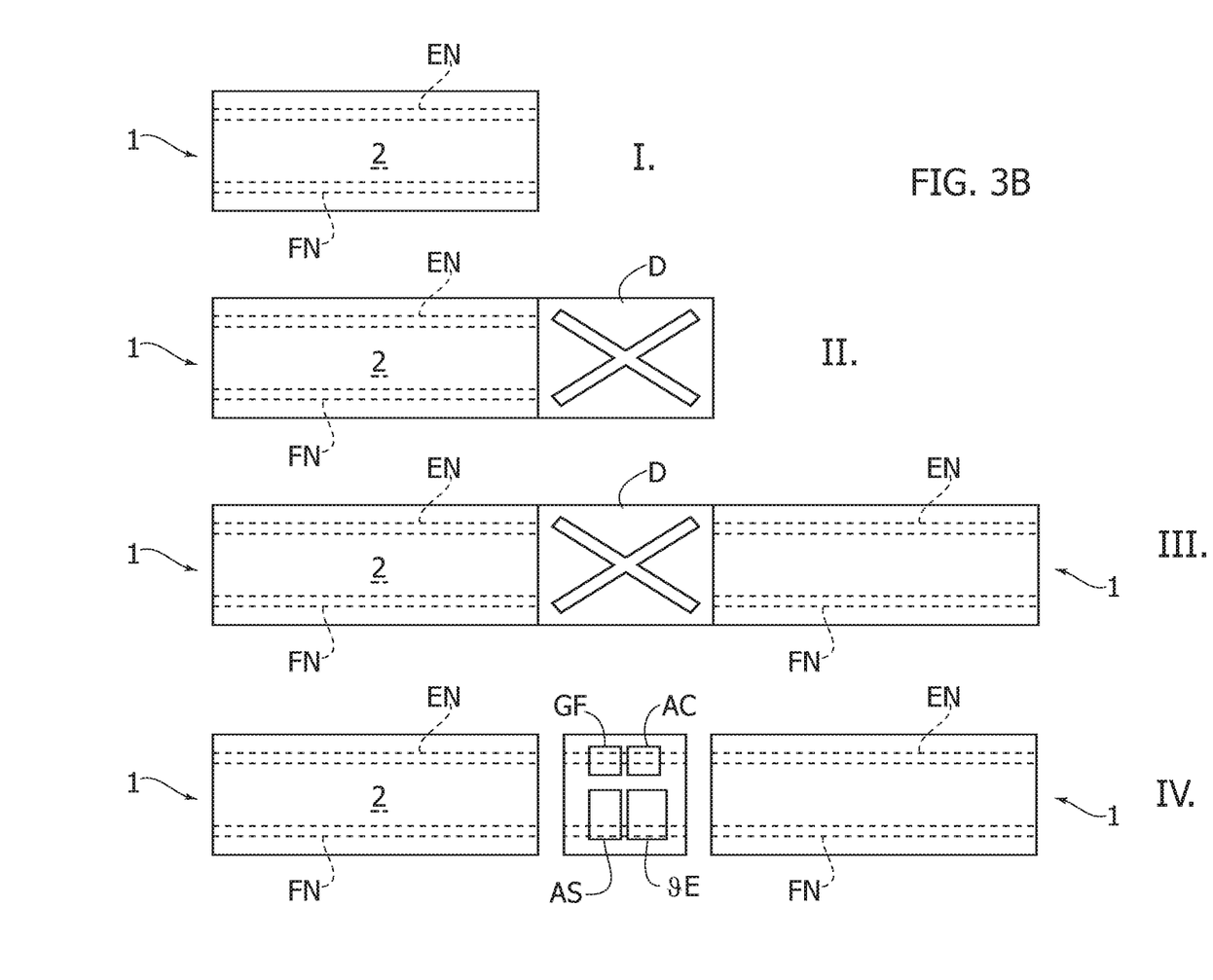
FIG. 3B, in parts I-IV, illustrates a sequence of connection of the service station of FIG. 3A.

FIG. 3B, in parts I-IV, shows schematically a sequence of installation of the station SS between two adjacent stations 1. As soon as the first station 1 (part I) has been provided, set alongside this is a template D, the footprint of which substantially corresponds to the footprint of the station SS (part II).

After this, the second station 1 is positioned alongside the template D (once again using forklift truck or other manipulator) (part III).

The template D is then removed, and the station SS is inserted in position between the two stations 1 (part IV). The units AC, GF, AS, QE are then operatively and mechanically connected to the stations 1 by means of the interface units 4.

It should moreover be noted that, even though FIG. 3B illustrates installation of the service station SS in a position comprised between two aligned stations 1, the station SS can be equipped with interface units 4 on all four sides or on adjacent sides so as to enable installation thereof between two stations 1 arranged orthogonal to one another (i.e., with the respective interface units arranged at 90° with respect to one another).

Thanks to the method according to the invention, it is hence possible to set under way a production cycle without any need for carrying out civil works and/or installing complex fixed networks and systems. In addition, the plant can be set up in any industrial building, without any particular structural requirements of any sort, given that the systems equipment is already provided on board the stations 1, and recourse to overhead lines is not envisaged. The industrial building that is to house the stations 1 becomes—in the limit—a mere "container" of a modular industrial plant obtained by combining the stations 1.

For instance, in the case where there arises the need to set up industrial plants that operate on a small scale in a range of production sites in order to replicate one and the same type of production on a small scale over a more extensive territory and/or in order to produce parts of a single product at a local level, it is possible to define, at the central company level, the work cycle that each production plant is to carry out, and subsequently ship the required mobile processing stations to each site using the means of transport normally used for logistics of goods travelling via container.

The fact that the platforms 2 are palletisable enables these to be transported by means of merchant vessels, rail vehicles, and articulated lorries, all of which being means of transport that are extremely well tested and are capable, in combination, of achieving a good degree of capillarity in distribution of the stations 1.

Thanks to the method and to the stations 1 according to the invention, not only is fast setting-up of an industrial plant possible, but an equally fast reconfiguration thereof is also possible.

In particular, in the case where an additional mobile processing station is provided, the existing constraints in location of the stations in known plants are no longer present; i.e., it is not necessary for the station to be inserted in pre-set points of the plant corresponding to the areas where the vacant stations are arranged.

Provision of vacant stations remains a design constraint necessary for allowing the possibility of recombining the layout of the stations 1, but in no way will the additional stations necessarily have to be placed where the pre-existing vacant stations are present.

In particular, in the case of reconfiguration by addition of a station 1 (FIGS. 4A and 4B), once the additional mobile processing station 1 has been provided, the next step is to shift one or more mobile processing stations (once again, preferably using forklift trucks FT) so as to create a vacancy between adjacent mobile processing stations at the point where it is necessary for the additional mobile station to be inserted. The vacancy is created by decoupling the at least one interface unit of each mobile processing station from that of the adjacent station prior to displacement thereof. By way of example, if the additional station 1 is located after the third station in a row of stations 1 originally made up of six elements, then the method according to the invention consists in decoupling the stations 1 that occupy the first position up to the third position from the rest of the row, shifting each of the stations back by one position, using the forklift trucks FT (or some other system designed for movement of the palletisable platforms 2) so as to create a vacancy between the station 1 originally occupying the third position and the station 1 originally occupying the fourth position, and inserting the new station 1 in the vacancy thus created. In this regard, since the platforms 2 are palletisable, it is preferable to envisage systems for mechanical coupling of the palletisable platforms 2, these systems enabling disengagement of the platform 2 from the adjacent ones with a vertical movement, given that this is the movement imparted via the forklift trucks FT. For this purpose, by providing the interface units 4 according in the version with the head H and the extensible portion B, it is possible to proceed to disengaging by performing a vertical movement, once the continuity between the adjacent interface units 4 has been interrupted.

Figure 4A:
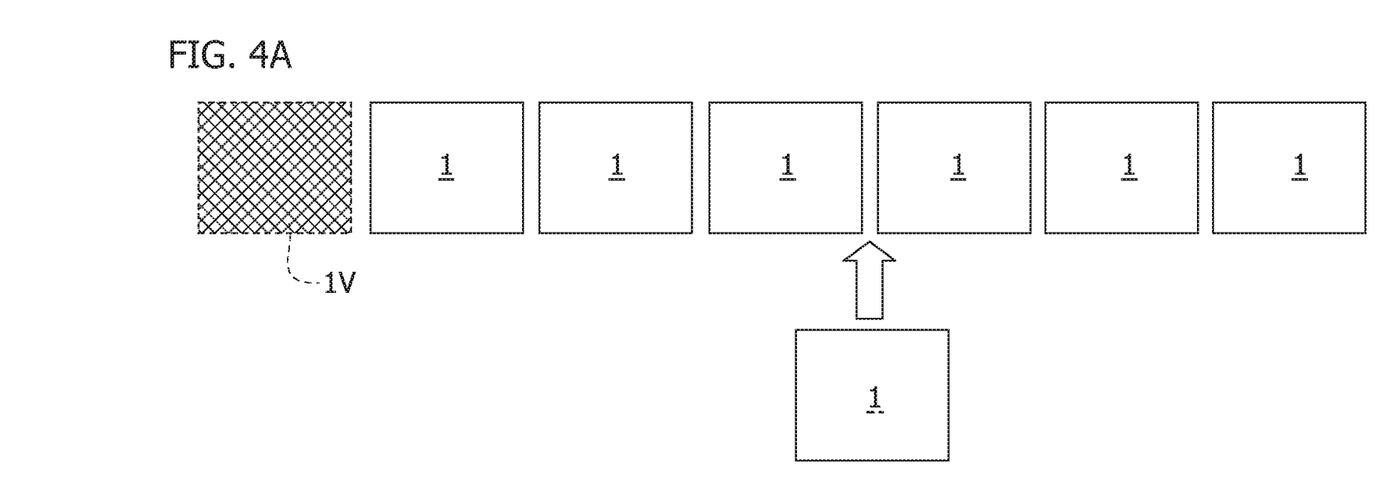
FIGS. 4A and 4B illustrate two steps of a sequence of reconfiguration of an industrial plant according to the method underlying the invention, in the case in point a reconfiguration by addition.
Figure 4B:
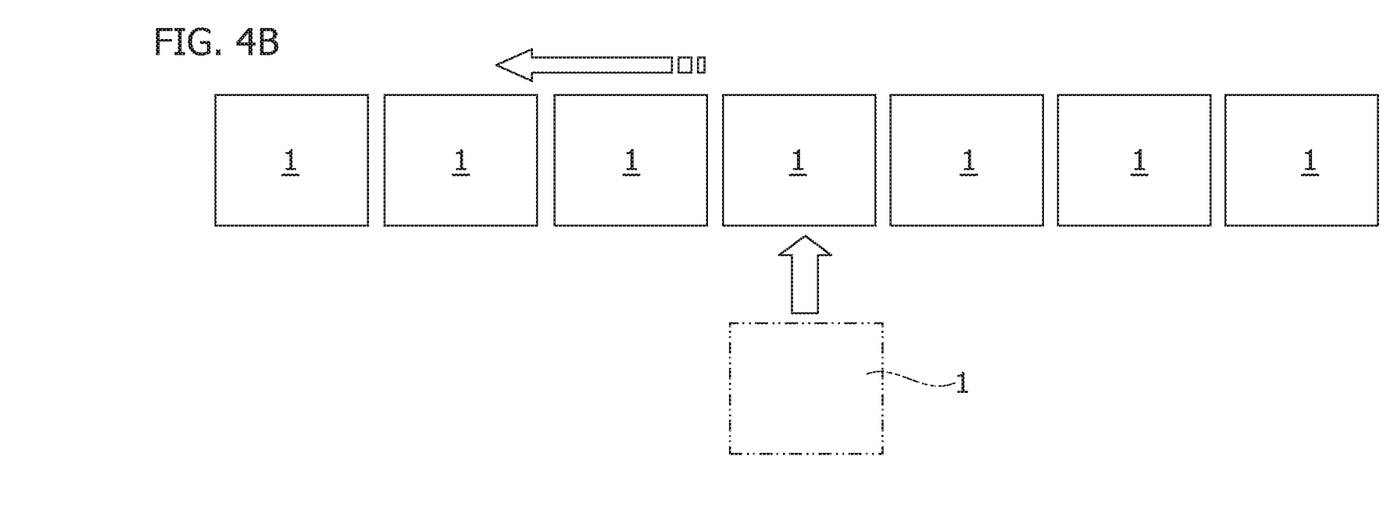

The sequence referred to above applies, of course, on the condition that there exists a vacant station 1V upstream of the stations 1 occupying the first position up to the third position. In the case where the vacant station were located downstream of the station 1 originally in the sixth position, then the operation referred to above would involve the stations 1 that originally occupied the fourth position up to the sixth position, which would be shifted forwards by one position so as to create the required vacancy.

Once the additional mobile processing station has been located in the vacancy thus created, the activity of the plant can be resumed as soon as coupling between the interface units of the new station and the interface units of the adjacent stations has been restored according to the need.

It should moreover be noted that the same method, with the appropriate modifications, can be applied also in the case of reconfiguration by subtraction of processing stations.

Figure 5A:
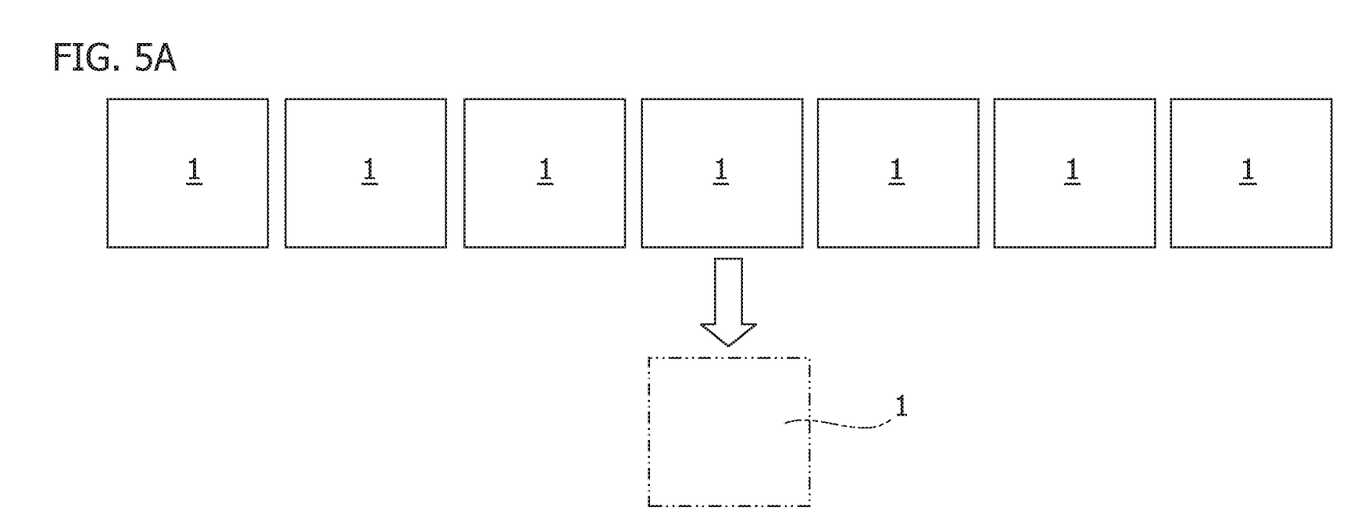
FIGS. 5A and 5B illustrate two steps of a sequence of reconfiguration of an industrial plant according to the method underlying the invention, in the case in point a reconfiguration by subtraction.
Figure 5B:
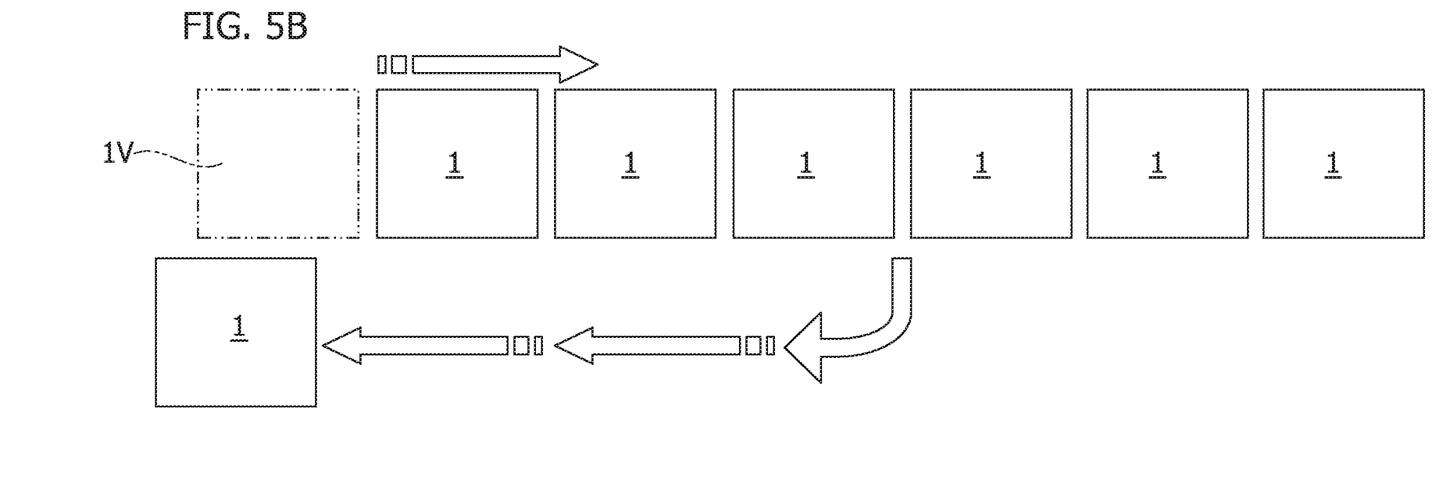

In this case (FIGS. 5A and 5B), once the mobile processing station that is to be eliminated has been identified, the next step is to decouple the interface units thereof from the interface units of the adjacent stations. The station is then removed by being lifted and moved away using a forklift truck, and the surviving stations 1 are joined up again so as to fill the vacancy created by the station that has been removed and create a new vacancy elsewhere (typically upstream or downstream in a line, if the stations are arranged in sequence).

In the limit, by decoupling all the interface units of all the stations it is possible to re-arrange the entire lot of mobile processing stations 1 of the plant according to a new pre-set layout, dictated, for example, by a sudden demand for production of a new model of motor vehicle.

Figure 6:
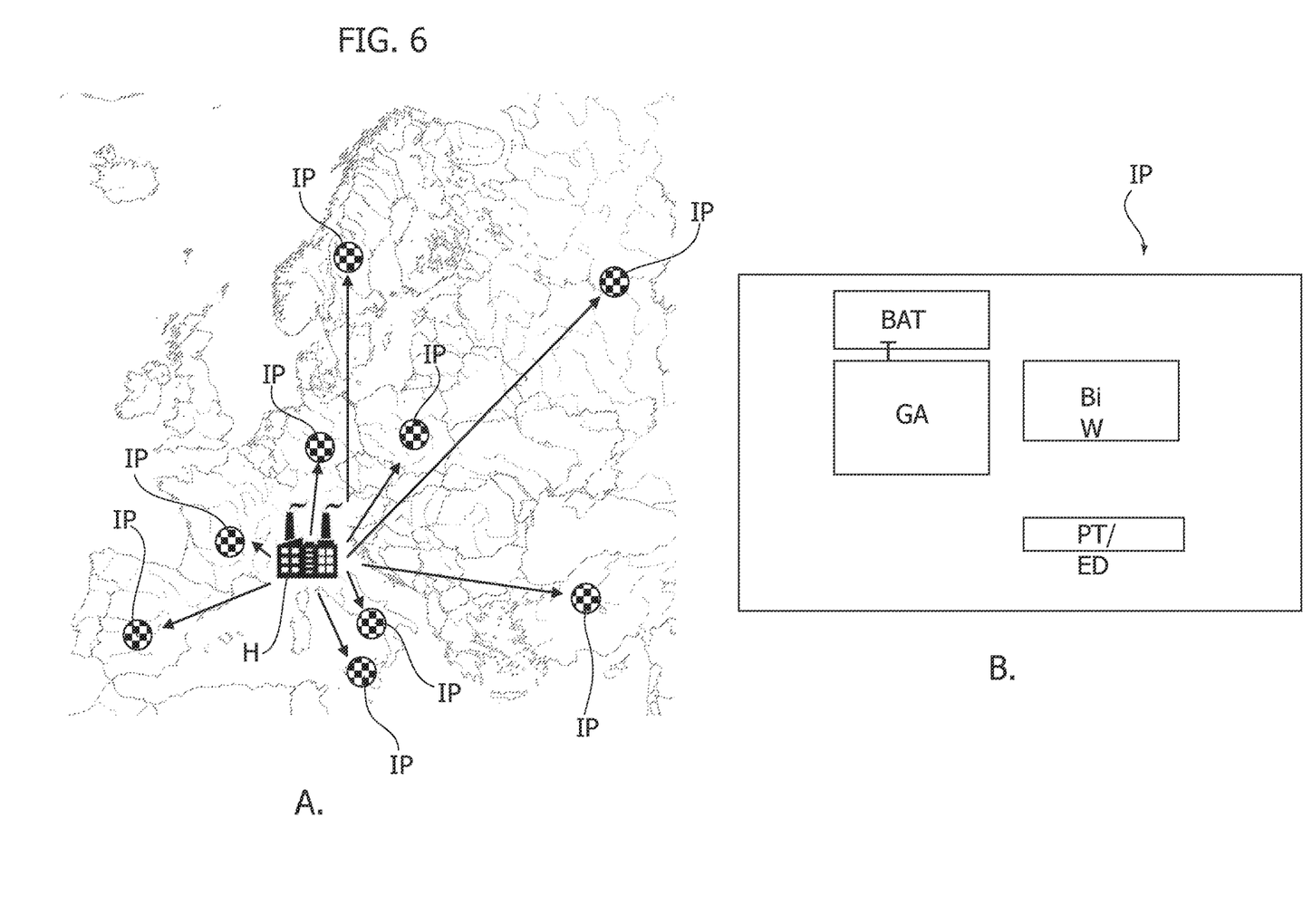
FIGS. 6 to 8 illustrate examples of logics of distribution and setting-up of industrial plants that exploit the method according to the invention.
Figure 7:
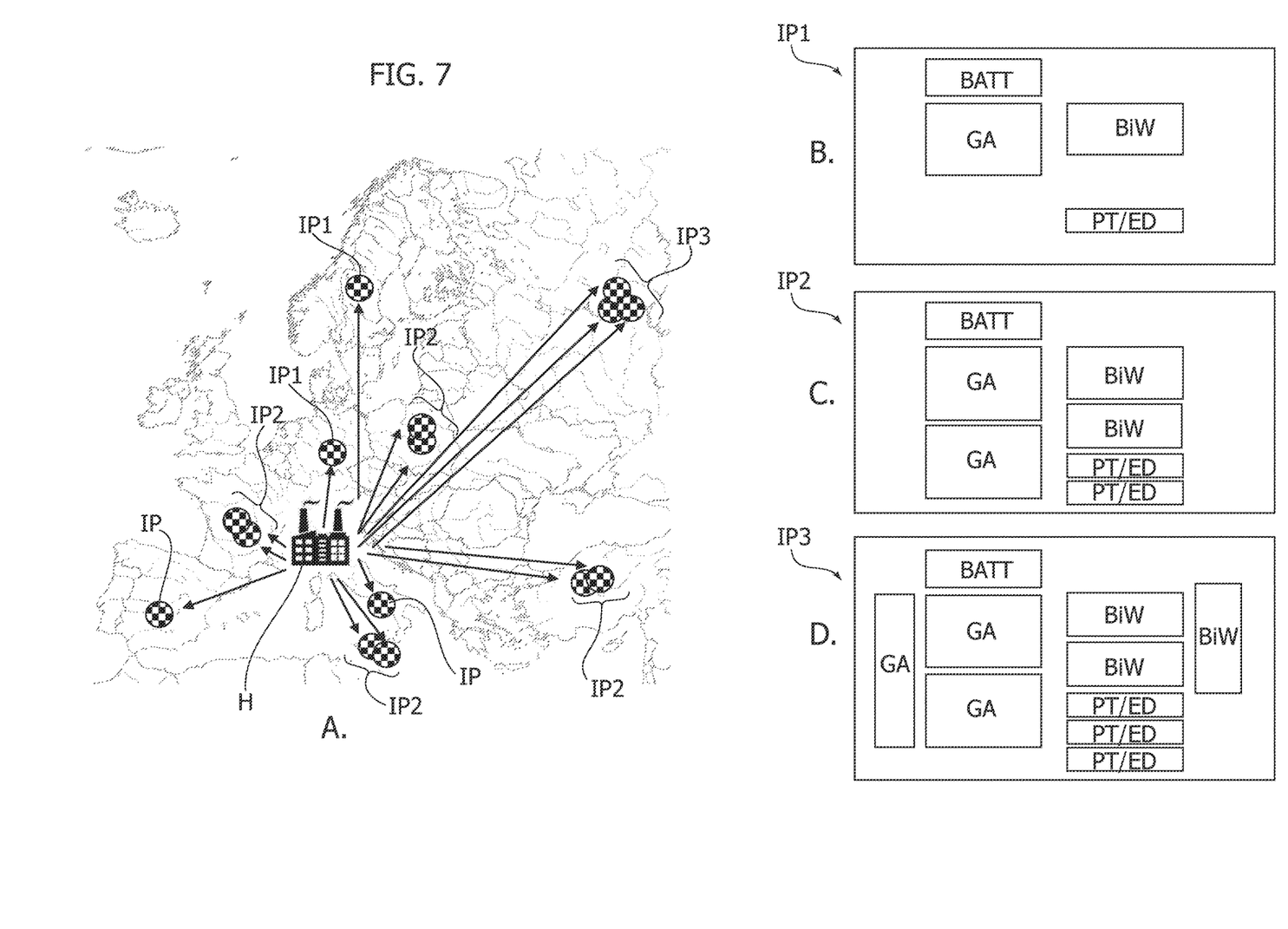
Figure 8:
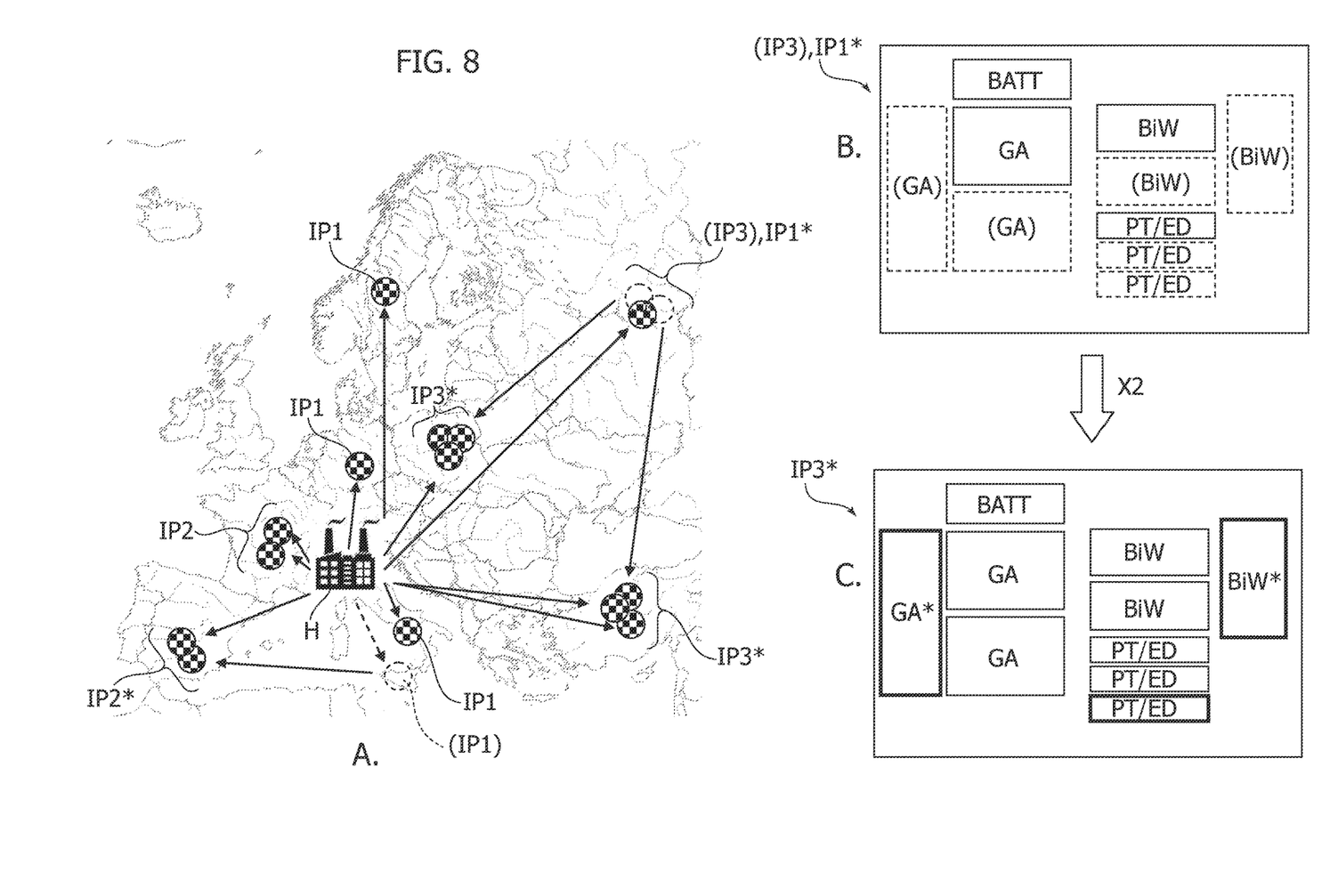

The method according to the invention moreover underlies the logic of distribution and/or setting-up of industrial plants illustrated schematically in FIGS. 6 to 8.

With reference to FIG. 6, the modular nature of the mobile processing stations 1 and their transportability renders the entire industrial plant constituted by them in effect transportable wherever desired. As has already been said, since there are no longer constraints on the building that houses the plant, any site that houses an industrial building of a capacity sufficient for the needs of the plant is immediately ready to receive the plant itself. The building in question may even be rented for the period in which it will house the plant, and then be returned to the owner after the plant has been dismantled, for example on account of a new transfer.

With reference to FIGS. 6A, 7A, and 8A, the logic of distribution and/or setting-up of industrial plants according to the invention is managed in a centralised way by a co-ordinating industrial plant H, which is also responsible for execution of the work cycles that cannot be run using a plant that by its very nature has to be transportable (for example, in the case of an automotive firm, the co-ordinating plant H can carry out pressing of the sheets, given that industrial presses are in no any transportable in the manner envisaged for the stations 1). It may correspond, for example, to the main industrial structure of the company in the country of origin. The co-ordinating plant H defines, on the basis of the local national demand (here, for simplicity, application to the European area is illustrated, but the same may be replicated anywhere in the world), the capacity of the plants to be installed in the corresponding countries. By way of example, illustrated here is the case of a plant for the manufacture of motor vehicles designated by the reference IP, which comprises an accumulator and generator module BATT, an assembly module GA, a body-in-white module BiW, and a pre-treatment/cataphoresis/painting module PT/EDD (also in this case, in the light of what has been said above, the plant IP can receive already pre-treated and/or painted sheets according to the expected needs of the co-ordinating plant H). Each of these modules comprises a plurality of respective processing stations 1 assembled according to the method underlying the invention in order to carry out the sequence of operations required by the work cycle.

The situation illustrated in FIG. 6A corresponds to a scenario where the local plants IP distributed over the reference territory all have the same production capacity, measured in jobs per hour (jph). The specific structure of the individual plants may be the same or may differ, in regard to minor details, according, for example, to the characteristics of the industrial building that houses the plant IP in the individual country. Setting-up of the plants IP is carried out by implementing the method according to the invention and starting from shipments in loco of the ensemble of stations 1 required. Basically, with a view to simplifying the description and rendering it as schematic as possible, prior to the step of the method according to the invention that consists in arranging the mobile processing stations according to a pre-set layout, it is envisaged to ship ensembles of mobile processing stations 1 to one or more destinations concerned in setting up the industrial plant.

Of course, it is also possible to implement in the individual plants IP the methods of reconfiguration by addition or subtraction illustrated in FIGS. 4 and 5.

The situation represented in FIG. 7A corresponds to a scenario where the local plants IP distributed over the reference territory have different production capacities (once again measured in jph), for example as a result of a different demand for vehicles at the level of each given country. This means, in the perspective of the method according to the invention, the need for ensembles of mobile processing stations 1 that are a function of a local demand of goods to be produced via each industrial plant, which is specific for each of the destinations concerned.

By way of example, FIG. 7B-D illustrate three different plant configurations, all created applying the method according to the invention, which correspond to the following production capacities:

FIG. 7B: plant IP1, capacity N jph (e.g., 10 jph);

FIG. 7C: plant IP2, capacity 2N jph (e.g., 20 jph), i.e., twice the capacity of the plant IP1; the plant IP2 includes an additional module GA, an additional module BiW, and an additional module PT/ED; and FIG. 7D: plant IP3, capacity 3N jph (e.g., 30 jph), i.e., three times the capacity of the plant IP1; the plant IP3 comprises two additional modules GA, two additional modules BiW, and two additional modules PT/ED.

Again, the specific structure of the homologous modules in the individual plants may be the same or may differ as regards slight details, according, for example, to the characteristics of the industrial building that houses the plant in the individual country and/or to specific normative needs.

Setting-up of the plants IP1, IP2, IP3 is carried out by implementing the method according to the invention, starting from shipping in loco of the necessary ensembles of stations 1. Of course, it is also possible to implement within the individual plants IP1, IP2, IP3 the methods of reconfiguration by addition and subtraction illustrated in FIGS. 4 and 5. In an even more interesting way, the situation of distribution with different production capacities that characterises the situation of Figure ????7A [?7] is also suited to a process of re-modulation of capacity, as shown in FIG. 8A, which is once again based upon the methods of setting-up and reconfiguration described above.

FIG. 8A represents the following requirements, determined by the co-ordinating plant H:

a) need for increase of capacity in Spain (from IP1 to IP2);
b) need for increase of capacity in Poland (from IP2 to IP3);
c) need for increase of capacity in Turkey (from IP2 to IP3); and
d) availability/need for reduction of capacity in the Russian Federation and in Italy.

A first possibility consists in shipping new ensembles of stations 1 to the countries listed in points a), b), c) above, and in simultaneous dismantling/reduction of capacity in the countries indicated in point d), all carried out adopting the method according to the invention. However, this option is likely to introduce into the reference territory an excess of stations 1, the logistics (and—at this point—accumulation) of which should be managed separately, thus coming to erode the benefits deriving from the method according to the invention.

The most interesting possibility made available by the method according to the invention is outlined, instead, in the specific graphic representation of FIG. 8A, i.e., by re-directing resources from countries where the demand is lower than the current production capacity (point d) to countries where the demand is higher than the current production capacity (points a, b, and c).

In the situation illustrated here, the plant at capacity IP3 installed in the Russian Federation is cut down to the capacity IP1 (references (IP3), IP1 in FIGS. 8A and 8B), by eliminating two modules GA, two modules BiW, and two modules PT/ED. These eliminations are denoted by the references (GA), (BiW), (PT/ED). Of these modules, a first group comprising a module GA, a module BiW, and a module PT/ED is shipped to Poland, where the plant originally with capacity IP2 (reference (IP2) in FIG. 8C) is stepped up to the capacity IP3 (reference IP3* in FIG. 8C). The added modules are denoted by the references GA*, BiW*, PT*/ED* and are enclosed in boxes with thicker lines. A second group, once again comprising a module GA, a module BiW, and a module PT/ED is, instead, shipped to Turkey, where the plant originally at capacity IP2 (reference (IP2) in FIG. 8C) is stepped up to the capacity IP3 (reference IP3* in FIG. 8C). As mentioned above, the added modules are denoted by the references GA*, BiW*, PT*/ED* and are enclosed in boxes with thicker lines.

As regards Spain, the plant originally at capacity IP1 present in Italy is completely dismantled (reference (IP1) in FIG. 8A) and shipped to Spain, where the plant originally at capacity IP1 is stepped up to the capacity IP2 (reference IP2* in FIG. 8A).

In this way, it becomes possible to re-modulate with extreme rapidity and ease the volumes of production in the countries involves, thus rendering the method free from all the constraints proper to plants of a known type.

Of course, the details of construction and the embodiments may vary widely with respect to what has been described and illustrated herein, without thereby departing from the present invention, as defined by the annexed claims.

What is claimed is:

1. A method for setting up and/or reconfiguring an industrial plant, comprising:
providing a plurality of mobile processing stations, each mobile processing station of plurality of mobile processing stations comprising a palletisable platform and at least one interface unit provided on the palletisable platform and configured for coupling of that mobile processing station with one or more further adjacent mobile processing stations;
arranging said plurality of mobile processing stations according to a predetermined layout;
coupling the at least one interface unit of each mobile processing station with the at least one interface unit of one or more further mobile processing stations adjacent thereto, and
prior to arranging the plurality of mobile processing stations according to the pre-set layout, shipping the plurality of mobile processing stations to one or more concerned destinations for the set up of the industrial plant,
wherein each interface unit comprises at least one of the following:
an electrical and/or electronic coupling device;
a fluidic coupling device; and
a mechanical coupling device.

2. The method according to claim 1, wherein each mobile processing station of the plurality of mobile processing stations and the one or more further mobile processing stations comprises at least one of the following:
one or more processing machines;
one or more magazines for workpieces or components;
one or more tool magazines; and
one or more electronic controllers.

3. The method according to claim 1, further including a reconfiguration step comprising:
providing an additional mobile processing station in addition to the plurality of mobile processing stations and/or the one or more further mobile processing stations;
displacing of one or more mobile processing stations of the plurality of mobile processing stations and/or the one or more further mobile processing stations so as to create a vacancy between two adjacent mobile processing stations of the plurality of mobile processing stations and/or the one or more further mobile processing stations; and inserting said additional mobile processing station into said vacancy.

4. The method second claim 3, wherein said displacing of one or more mobile processing stations comprises, prior to displacement, decoupling the at least one interface unit of each mobile processing station of the two adjacent mobile processing stations.

5. The method claim 1, further including a reconfiguration step comprising:

identifying a mobile processing station of the plurality of mobile processing stations and/or the one or more further mobile processing stations to be eliminated;

decoupling the at least one interface unit of the mobile processing station to be eliminated from the at least one interface unit of each mobile processing station adjacent the mobile processing station to be eliminated; and removing the mobile processing station to be eliminated.

6. The method according to claim 5, further including displacing one or more mobile processing stations of the plurality of mobile processing stations and/or the one or more further mobile processing stations so as to fill a vacancy created with removal of the mobile processing station to be eliminated.

7. The method according to claim 1, wherein said providing the plurality of mobile processing stations comprises providing the plurality of mobile processing stations on a basis of a local demand for goods to be produced by the industrial plant, specific to each of said concerned destinations involved.

8. The method according to claim 7, further comprising, subsequent to the setting up of the industrial plant, varying a production capacity thereof by increasing or eliminating groups of the plurality of mobile processing stations and/or the one or more further mobile processing stations in one or more of said concerned destinations involved.

9. The method according to claim 8, further including shipping the groups of the plurality of mobile stations eliminated in one of said concerned destinations to another of said concerned destinations where an increase in production capacity is required.

* * * * *